United States Patent [19]

Duckett et al.

[11] 4,093,764

[45] June 6, 1978

[54] COMPRESSIBLE PRINTING BLANKET

[75] Inventors: John C. Duckett, Clyde; Andrew J. Gaworowski, Waynesville, both of N.C.

[73] Assignee: Dayco Corporation, Dayton, Ohio

[21] Appl. No.: 731,888

[22] Filed: Oct. 13, 1976

[51] Int. Cl.² .................... B32B 5/22; B32B 5/12; B32B 3/26
[52] U.S. Cl. ..................... 428/113; 428/300; 428/301; 428/317; 428/909
[58] Field of Search ............. 428/909, 230, 232, 234, 428/235, 238, 246, 250, 257, 267, 265, 295, 322, 300, 288, 304, 114, 310, 302, 315, 316, 113, 317

[56] References Cited

U.S. PATENT DOCUMENTS

| 1,703,636 | 2/1929 | Rasch | 428/300 |
| 3,578,544 | 5/1971 | Thorsrud | 428/316 X |

FOREIGN PATENT DOCUMENTS

| 1,219,009 | 1/1971 | United Kingdom | 428/114 |
| 20,517 of | 1913 | United Kingdom | 426/246 |

*Primary Examiner*—George F. Lesmes
*Assistant Examiner*—Alexander S. Thomas
*Attorney, Agent, or Firm*—Reuben Wolk

[57] ABSTRACT

A compressible printing blanket is provided which has a compressible body comprised of an elastomeric matrix having randomly disposed voids therein and a plurality of layers of discrete fibers bonded together by said matrix as a single mass with each of the layers having its fibers randomly disposed in substantially parallel relation and substantially uniformly throughout the layers with the fibers in each layer being disposed transverse the fibers of an adjoining layer.

18 Claims, 5 Drawing Figures

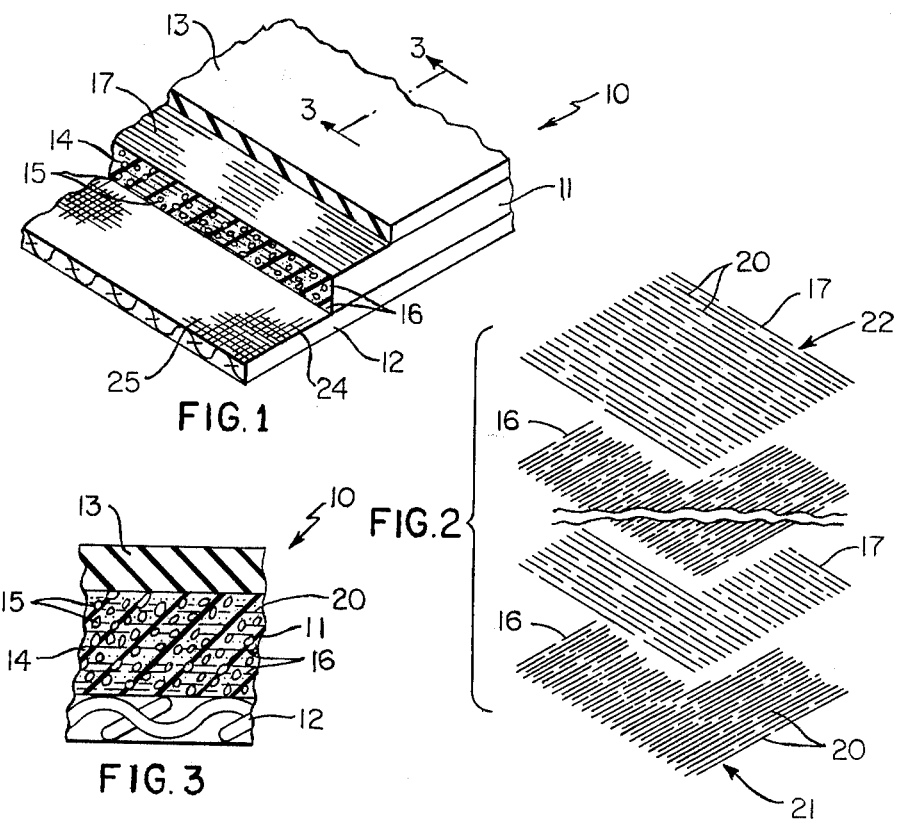
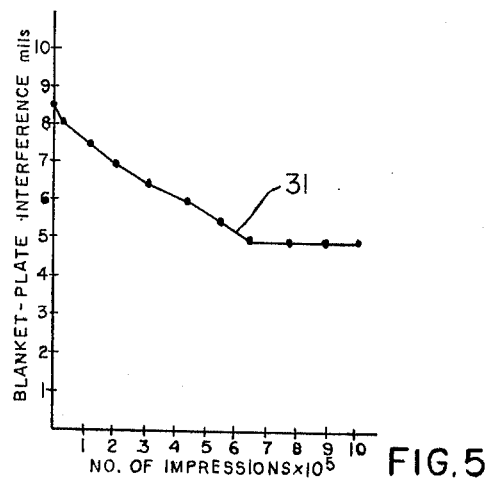
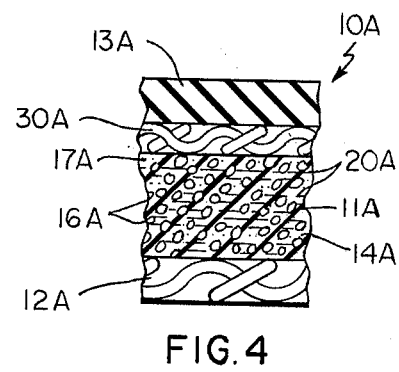

COMPRESSIBLE PRINTING BLANKET

BACKGROUND OF THE INVENTION

This invention relates to printing blankets and in particular to a so-called compressible printing blanket of the type used in offset lithographic printing.

In offset lithography the usual function of a printing blanket is to transfer printing ink from a printing plate to an article such as paper being printed whereby the printing blanket comes into repeated contact with an associated printing plate and the paper being printed. This repeated contact causes compression and permanent set (referred to as compression set) of the blanket with extended use whereby it is important that the blanket construction be such that it is self-recovering or resilient within acceptable limits even with compression set of such blanket to assure satisfactory printing. Ideally it is desirable to provide a blanket that is capable of providing satisfactory printing even with compression set over a wide range of interference between the printing blanket and printing plate, i.e., a wide blanket to plate interference range.

SUMMARY

It is a feature of this invention to provide a simple and economical printing blanket which is particularly adapted to be used in offset printing, or the like, and which is capable of providing satisfactory printing over a wide printing blanket to printing plate interference range.

Another feature of this invention is to provide a printing blanket of the character mentioned capable of operating over a blanket to plate interference range of the order of 4 to 11 mils with minimal change in print quality.

Another feature of this invention is to provide a blanket of the character mentioned made of a plurality of layers laminated together as a unitary single-piece construction.

Another feature of this invention is to provide a compressible printing blanket comprising a base ply, a printing face, and a compressible body disposed between the base ply and the printing face with the compressible body comprising an elastomeric matrix having voids disposed therein substantially uniformly and a plurality of layers of discrete fibers bonded together by the matrix as a single mass. Each of the fiber layers of the body has its fibers randomly disposed in substantially parallel relation and substantially uniformly throughout the layer with the fibers in each layer being disposed transverse the fibers of an adjoining layer to provide a uniform embedment of fibers throughout the matrix with the uniform embedment of the fibers and uniform disposal of the voids providing more precise control of the compression and resiliency characteristics of the body at each location throughout whereby such body assures satisfactory operation of the blanket over a substantial range of interference between the blanket and printing means associated therewith.

Accordingly, it is an object of this invention to provide a printing blanket having one or more of the novel features set forth above or hereinafter shown or described.

Other details, features, objects, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which FIG. 1 is a perspective view with parts in cross section, parts in elevation, and parts broken away illustrating one exemplary embodiment of a compressible printing blanket of this invention;

FIG. 2 is an exploded perspective view illustrating a few of the plurality of layers of discrete fibers comprising a compressible body portion of the blanket of FIG. 1;

FIG. 3 is an enlarged cross-sectional view taken essentially on the line 3—3 of FIG. 1;

FIG. 4 is a view similar to FIG. 3 illustrating another exemplary embodiment of the blanket of this invention; and FIG. 5 is a view particularly illustrating a graph of the compression set of a printing blanket of this invention during continuous operation yet with such blanket still providing satisfactory print quality.

DESCRIPTION OF ILLUSTRATED EMBODIMENTS

Reference is now made in FIG. 1 of the drawing which illustrates one exemplary embodiment of a compressible printing blanket of this invention which is designated generally by the reference numeral 10. The blanket 10 is particularly adapted to be used in offset lithography and has a unique inexpensively produced compressible layer or body which is designated generally by the reference numeral 11 and will be described in detail subsequently which enables the blanket 10 to be used with substantial interference between such printing blanket 10 and a printing means such as a printing plate associated therewith with satisfactory print quality and minimal change of such quality throughout the entire interference range and operating life of the blanket.

The blanket 10 comprises a base layer or play 12 and a printing layer or printing face 13 with the compressible body 11 being disposed in sandwiched relation between the base ply 12 and printing face 13. The compressible body 11 is comprised or made of an elastomeric matrix material or matrix 14 having open volumes or voids 15 disposed therein substantially uniformly. The voids 15 comprise between 40 and 60% of the volume of the compressible body 11 whereby the voids 15 may be considered as comprising roughly 50% of such compressible body.

The compressible body 11 has a plurality of layers of discrete fibers bonded together by the matrix 14 as a single mass and such layers are in the form of what may be considered warp layers 16 and weft or fill layers 17 with the fibers in each layer being designated by the same reference numeral 20. Each of the layers 16 and 17 has its fibers 20 randomly disposed in substantially parallel relation and substantially uniformly throughout the layer with the fibers 20 in each layer being disposed transverse the fibers of an adjoining layer to provide a uniform embedment of fibers 20 throughout the matrix 14. In this example the fibers 20 in the weft layers 17 are disposed perpendicular to the fibers 20 in the warp layers 16, see FIG. 2 and preferably there are roughly half as many fibers in each weft layer 17 as in each warp layer 16.

The uniform embedment of the fibers 20 and uniform disposal of the voids 15 provide a more precise control of the compression and resiliency characteristics of the body 11 at each location throughout such body. Thus, the body 11 assures satisfactory operation of the blanket 10 over a substantial range of interference between such blanket and printing means in the form of a printing plate, or the like, associated therewith. The fibers 20 have been described as comprising warp layers 16 and weft layers 17; however, it is to be understood that the fibers of each layer are actually compacted against the fibers of an adjoining layer and not interwoven therewith as in the usual disposal of warps and wefts.

The compressible body 11 of the blanket 10 may be defined using any technique known in the art; however, such body is preferably defined by disposing fibers 20 in parallel relation and in a random manner to define a typical warp layer 16 essentially as shown at 21 in FIG. 2. Similarly fibers 20 preferably made of the same material as the fibers 20 of layer 16 are disposed transverse thereto to define a weft or fill layer 17 and as shown at 22. This procedure is repeated alternating warp layers 16 and weft layers 17 until the desired number of layers is provided and a fluffy mass of fibers is provided with fibers of adjoining layers extending transverse each other and preferably perpendicular to each other. In a typical body 11 a plurality of at least three layers 16 and 17 of fibers 20 are provided. This fluffy mass of fibers is then suitably compressed, between rollers, for example, and needle punched, i.e., punched using needles which are disposed approximately ⅛ inch apart and several thousandths inch diameter, to define a needle-punched sheet of compacted layers of fibers. The needle punching serves to rearrange certain of the fibers perpendicular to a typical plane of fibers and such rearrangement results in the rearranged fibers serving as binders or binding fibers for the layers as well as resilient columns. This compacted sheet of oriented discrete fibers is then immersed in a suitable elastomeric solution which in this example preferably is in the form of a solution of nitrile rubber whereby the rubber surrounds the fibers and defines a rubber impregnated sheet of fibers. This rubber-impregnated sheet is then passed and cured such that it defines the body 11 which has the integral voids 15 disposed substantially in a uniform manner throughout. The fibers 20 in each layer and hence throughout the body 11 are also uniformly disposed due to their precise initial placement or orientation.

The blanket 10 is suitably defined by providing the base ply 12 of a suitable woven material, spreading a suitable adhesive latex on the ply 12, then applying the body 11 on the base ply 12, and finally forming the printing face 13 thereon as by spreading a plurality of thicknesses of a suitable rubber compound to define a laminated construction; and, such laminated construction is then suitably cured using any technique known in the art to bond the layers together as a unit or mass and complete the blanket 10.

The completed blanket 10 when subjected to what is considered a standard pressure of 125 psi perpendicular to the printing face is highly resilient. This resiliency is due to the precise arrangement of the fibers 20 and voids 15 as well as the character of the rubber matrix 14 comprising the body 11. Further, it has been found that the blanket 20 of this invention is capable of operating over a substantial range of interference between the blanket and a printing plate and as will as defined in detail subsequently.

The elastomeric matrix 14 comprising the compressible body 11 has been described as being a nitrile rubber; however, it will be appreciated that any suitable rubber compound known in the art may be used to define such matrix.

The fibers 20 are solid fibers, i.e., of solid cross section, and preferably such fibers are in the form of polyester fibers. The fibers 20 may range in length from a fraction of an inch to several inches and in one example of this invention fibers roughly 1¼ inches in length were satisfactorily used. The fibers 20 may be of any suitable diameter which may be generally of the order of several mils.

The base ply 12 of the printing blanket 10 is preferably such that it has optimum dimensional stability. In particular, the construction of such base ply is such that it substantially retains its dimensions without undue elongation or instability even under continuously applied operating tension of the magnitude employed in a printing blanket during normal use.

The base ply is preferably a woven fabric layer 12 and as seen in FIG. 1 has warps 24 and wefts 25. If desired, the woven fabric layer 12 may be reinforced by making its warps and/or wefts of aramid yarn. Aramid is a generic fiber classification authorized by the United States Federal Trade Commission for an organic fiber within the family of aromatic polyamides. An example of aramid yarn is one made and sold under the registered trademark "Kevlar" by the E. I. DuPont de Nemours & Co. Inc. of Wilmington, Delaware. However, it will be appreciated that the base ply or fabric layer 12 may be made of any suitable material employed in the art for this purpose, provided that such base ply is used with the compressible body 11 as disclosed herein.

The printing layer or printing face 13 is preferably made of any suitable rubber compound used in the art for this purpose and may be of any suitable thickness compatible with the application of the blanket. As explained earlier, the printing face 13 may be defined by conventional spreading process in which a plurality of layers are spread one on top of the other until the desired thickness for the printing face 13 is defined whereupon the blanket construction is then suitably cured.

Having described the blanket 10 and a typical method of making same, an example of the dimensions of a typical blanket 10 made in accordance with this invention will now be presented. In such typical blanket the base ply may have a thickness of 0.015 inch plus or minus 0.003 inch and may be made of a woven fabric. The compressible body 11 comprised of its matrix 14 and plurality of layers 16-17 of polyester fibers may have a thickness of 0.035 inch plus or minus 0.005 inch. The rubber printing face 13 may have a thickness of 0.015 inch plus or minus 0.003 inch.

Another exemplary embodiment of the printing blanket of this invention is illustrated in FIG. 4 of the drawing. The blanket illustrated in FIG. 4 is similar to blanket 10; therefore, such blanket will be designated by the reference numeral 10A and representative parts of such blanket which are similar to corresponding parts of blanket 10 will be designated in the drawing by the same reference numerals as in the blanket 10 (whether or not such representative parts are mentioned in the specification) followed by the letter designation A and not described again in detail. Only those component parts of the blanket 10A which are different from corresponding parts of the blanket 10 will be designated by a new reference numeral also followed by the letter designation A and described in detail.

The blanket 10A of FIG. 4 has a base ply 12A, a compressible body 11A defined by a plurality of layers 16A–17A of fibers 20A bonded together in an elastomeric matrix 14A, and a printing face 13A. The main difference between the blanket 10A and the blanket 10 is that the blanket 10A has a reinforcing layer 30A disposed between its printing face 13A and compressible body 11A.

The reinforcing layer 30A is preferably in the form of a woven layer similar to its base layer 12A. However, it is to be understood that the reinforcing layer 30A need not necessarily be a woven layer but may be any suitable layer made in accordance with any technique employed in the art. The reinforcing layer 30A provides additional reinforcement for the blanket 10A.

The blanket of this invention (whether in the form of blanket 10 or 10A) has optimum dimensional stability under normal operating tension. Further, such blanket is capable of operating reliably over a wide range of interference, i.e., 0.004 inch – 0.011 inch or otherwise stated 4–11 mils, between the blanket and an associated printing plate while retaining optimum print quality. The blanket of this invention also operates satisfactorily over an extended service life even with compression set or permanent drop in thickness of such blanket. To highlight this point reference is made to FIG. 5 of the drawing which shows a graph 31 of blanket to plate interference in mils versus number of printing impressions wherein a blanket having an initial interference of 8.5 mils was continuously operated on a printing press and after a million impressions the blanket to plate interference with 5 mils yet the blanket provided satisfactory print quality.

In this disclosure of the invention the fibers 16 have been described as being polyester fibers. However, it will be appreciated that other suitable fibers may be utilized together with a suitable elastomeric matrix compatible therewith.

The amount of fibers 20 disposed in the elastomeric matrix 14 may vary within an acceptable range. In the case of polyester fibers 20 and nitrile rubber defining the matrix 14 the fibers may vary from 20 to 50 percent by weight of the total weight of the nitrile rubber plus the fibers. In one example of the invention 36 percent by weight of the body 11 was polyester fibers and the balance of 64% was nitrile rubber.

It will be appreciated that the amount of fibers 20, nitrile rubber 14, and voids 15 determine the density of the body 11 and in one exemplary blanket such body has a density of 0.485 grams per cubic centimeter.

While present exemplary embodiments of this invention, and methods of practicing the same, have been illustrated and described, it will be recognized that this invention may be otherwise variously embodied and practiced within the scope of the following claims.

What is claimed is:

1. A compressible printing blanket comprising, a woven base ply, a rubber printing face, and a compressible body disposed between said base ply and said printing face, said compressible body comprising an elastomeric matrix having voids disposed therein substantially uniformly and a plurality of needle-punched layers of discontinuous fibers bonded together by said matrix as a single mass, each of said layers having its fibers disposed in substantially parallel relation and substantially uniformly throughout the layer with the fibers in each layer being disposed transverse and against the fibers of an adjoining layer to define a compacted sheet of oriented discrete fibers which results in a uniform embedment of fibers throughout said matrix, said uniform embedment of said fibers resulting in said uniform disposal of said voids and providing more precise control of the compression and resiliency characteristics of said body at each location throughout, said body assuring satisfactory operation of said blanket over a substantial range of interference between said blanket and printing means associated therewith, said voids comprising about 40-60% of the volume of the compressible body.

2. A blanket as set forth in claim 1 in which said fibers have a length ranging between a fraction of an inch and several inches and a diameter generally of the order of a few mils.

3. A blanket as set forth in claim 1 in which said elastomeric matrix is a rubber compound.

4. A blanket as set forth in claim 1 in which said elastomeric matrix is a nitrile rubber.

5. A blanket as set forth in claim 1 in which said elastomeric matrix is a nitrile rubber and said fibers are polyester fibers.

6. A blanket as set forth in claim 5 in which said base ply is a woven fabric which retains its dimensions under normal operating tension.

7. A blanket as set forth in claim 5 in which said base ply is a woven fabric reinforced with yarn made of an aromatic polyamide.

8. A blanket as set forth in claim 5 and further comprising a reinforcing layer disposed between said body and said printing face.

9. A blanket as set forth in claim 8 in which said reinforcing layer is a woven layer.

10. A blanket as set forth in claim 5 in which said layers of fibers comprise a plurality of warp layers and a plurality of weft layers disposed in an alternating manner.

11. A blanket as set forth in claim 10 in which each of said weft layers has roughly one half as many fibers as each of said warp layers.

12. A blanket as set forth in claim 5 in which said compressible body is comprised of from 20 to 50 percent by weight of said polyester fibers.

13. A blanket as set forth in claim 5 in which said compressible body is comprised of generally of the order of one third by weight of polyester fibers and the balance of nitrile rubber.

14. A blanket as set forth in claim 5 in which certain of said polyester fibers are disposed approximately perpendicular to a plane coinciding with the outside surface of said printing face, said perpendicular fibers serving as bendable column which help improve the resiliency of said blanket.

15. A compressible printing blanket comprising, a woven base ply, a rubber printing face, and a compressible body disposed between said base ply and said printing face, said compressible body comprising a nitrile rubber matrix having voids disposed therein substantially uniformly and a plurality of needle-punched layers of discontinuous polyester fibers bonded together by said matrix as a single mass, each of said layers having its fibers disposed in substantially parallel relation and substantially uniformly throughout the layer with the fibers in each layer being disposed transverse and against the fibers of an adjoining layer to define a compacted sheet of oriented discrete fibers which results in a uniform embedment of fibers throughout said matrix, said uniform embedment of said fibers resulting in said uniform disposal of said voids and providing more precise control of the compression and resiliency characteristics of said body at each location throughout, said body assuring satisfactory operation of said blanket with said blanket operating with an interference between said blanket and associated printing means ranging between four and eleven mils, said voids comprising between about 40-60% of the volume of the compressible body.

16. A blanket as set forth in claim 15 in which said voids comprise roughly 50% of the volume of said compressible body.

17. A blanket as set forth in claim 16 in which said fibers have a length ranging between a fraction of an inch and several inches and a diameter generally of the order of a few mils.

18. A blanket as set forth in claim 17 and further comprising a reinforcing layer disposed between said compressible body and said printing face.

* * * * *

UNITED STATES PATENT OFFICE
CERTIFICATE OF CORRECTION

Patent No. 4,093,764          Dated 6-6-78

Inventor(s) John C. Duckett and Andrew J. Gaworowski

It is certified that error appears in the above-identified patent and that said Letters Patent are hereby corrected as shown below:

Column 3, line 40, "passed" should be -- pressed -- .

Column 3, line 64, "as" (second occurrence) should be -- be -- .

Signed and Sealed this

Twenty-third Day of January 1979

[SEAL]

Attest:

RUTH C. MASON
Attesting Officer

DONALD W. BANNER
Commissioner of Patents and Trademarks